United States Patent [19]
Van Zeeland

[11] Patent Number: 6,130,593
[45] Date of Patent: Oct. 10, 2000

[54] SWITCH PANEL HAVING A MAGNETICALLY-RETAINED OVERLAY

[75] Inventor: Anthony J. Van Zeeland, Mesa, Ariz.

[73] Assignee: DuraSwitch Industries Inc., Mesa, Ariz.

[21] Appl. No.: 09/396,904

[22] Filed: Sep. 15, 1999

Related U.S. Application Data

[63] Continuation of application No. 09/160,645, Sep. 25, 1998, Pat. No. 5,990,772, which is a continuation-in-part of application No. 08/924,334, Sep. 5, 1997, Pat. No. 5,867,082, which is a continuation-in-part of application No. 08/646,083, May 7, 1996, Pat. No. 5,666,096, which is a continuation-in-part of application No. 08/458,989, Jun. 2, 1995, Pat. No. 5,523,730.

[51] Int. Cl.⁷ .................................................. H01H 9/00
[52] U.S. Cl. ........................ 335/205; 335/207; 335/512; 335/514
[58] Field of Search ............................ 335/205–207; 200/512, 514

[56] References Cited

U.S. PATENT DOCUMENTS

| | | |
|---|---|---|
| 3,383,487 | 5/1968 | Wiener .................................... 335/205 |
| 3,681,723 | 8/1972 | Goll ........................................ 335/207 |
| 4,077,036 | 2/1978 | Avakian .................................. 340/365 |
| 4,101,884 | 7/1978 | Benton, Jr. .............................. 340/366 |

*Primary Examiner*—Lincoln Donovan
*Assistant Examiner*—Tuyen Nguyen
*Attorney, Agent, or Firm*—McEachran, Jambor, Keating, Bock & Kurtz

[57] ABSTRACT

An electrical switch has a substrate with at least one pair of spaced switch contacts arranged to be shorted by an electrically conductive armature. The armature defines a central axis with first and second portions on either side of the axis which portions terminate at first and second edges. The armature is normally held spaced from the contacts by magnetic attraction to a coupler layer disposed in spaced relation to the substrate. The armature is movable by an actuating force to engagement with the substrate. The armature separates from the coupler layer by a double pivoting motion. An actuating force applied to the armature remote from its central axis causes one edge of the armature nearest the actuating force to break away from the coupler layer. The armature then pivots about the opposite edge of the armature until the one edge bottoms on the substrate. This is followed by the opposite edge of the armature breaking away from the coupler layer and pivoting about the one edge until the opposite edge bottoms on the substrate.

2 Claims, 2 Drawing Sheets

SWITCH PANEL HAVING A MAGNETICALLY-RETAINED OVERLAY

CROSS-REFERENCE TO RELATED APPLICATIONS

This application is a continuation application of application Ser. No. 09/160,645, filed Sep. 25, 1998 now U.S. Pat. No. 5,990,772, issued Nov. 23, 1999, which is a continuation-in-part of application Ser. No. 08/924,334, filed Sep. 5, 1997 now U.S. Pat. No. 5,867,082, issued Feb. 2, 1999, which is a continuation-in-part of application Ser. No. 08/646,083, filed May 7, 1996, now U.S. Pat. No. 5,666,096, issued Sep. 9, 1997, which is a continuation-in-part of Ser. No. 08/458,989, filed Jun. 2, 1995, now U.S. Pat. No. 5,523,730, issued Jun. 4, 1996.

BACKGROUND OF THE INVENTION

Membrane switches are well known for providing electrical switching functions in a reliable, compact package. Membrane switches typically have a flexible plastic membrane layer normally separated from a substrate by a non-conductive spacer. Openings in the spacer permit a user to push the membrane through the spacer, bringing facing electrical contacts on the internal surfaces of the membrane and substrate into contact with one another, thereby closing a switch. The natural resilience of the membrane returns the membrane to its spaced position upon removal of the actuating force.

While this basic membrane switch construction has many advantages, it does not provide some features desirable in certain applications. For example, an ongoing problem in membrane switches has been providing feedback to a user of switch actuation. Since the membrane travel to closure is very small most users cannot tell when they have actuated a switch unless there is something to indicate to them that closure has occurred. Aural feedback is common but not always desirable. Tactile feedback has been provided by clicker domes built into the membrane. In full travel keyboards feedback has been provided by a plastic actuator mounted above the membrane switch panel. Such actuators are usually complicated little devices which makes them relatively expensive.

SUMMARY OF THE INVENTION

A primary object of the present invention is a pushbutton switch which can be made as thin and compact as a membrane switch but provides a crisp tactile feedback without the use of clicker domes.

A further object of the invention is a pushbutton switch having reliable, predictable actuation force and tactile feedback.

Another object of the invention is a pushbutton switch having a removable overlay retained by magnetic interaction of the switch components and the overlay.

Still another object of the invention is a switch of the type described that has switch contacts arranged for a double actuation. That is, as the switch is actuated first one set of contacts are closed and subsequently a second set of contacts are closed.

Yet another object of the invention is a pushbutton switch of the type described that can be incorporated in a business card. Other objects may become apparent in the following specification.

The pushbutton switch has a substrate, a non-conductive spacer and a magnetic layer on top of the spacer. An armature in a spacer opening is made of material affected by a magnet and is also electrically conductive. The armature is pivotable between a normal position, in which it is spaced from electrodes on the substrate, and a closed position, in which it shorts the electrodes. The armature is held in its normal position by the magnetic attraction between the magnet layer and the armature. When a user applies an actuating force to the armature, it suddenly snaps free of the magnet layer and closes against the electrodes, providing a switch closure and tactile feedback thereof. Removal of the actuating force allows the magnetic layer to retract the armature and re-open the switch. A fulcrum built into one end of the armature assists the pivoting motion of the armature.

DETAILED DESCRIPTION OF THE DRAWINGS

Figure 1:
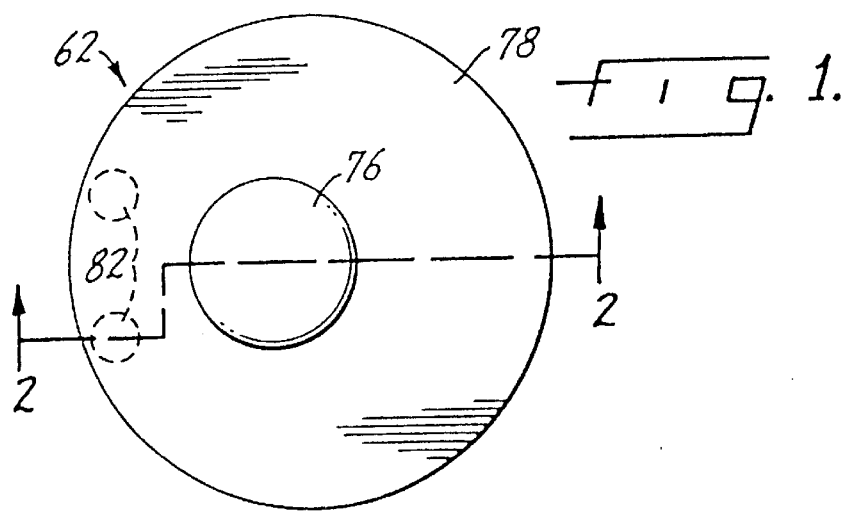
FIG. 1 is a plan view of an armature for a pushbutton switch according to the present invention.
Figure 2:
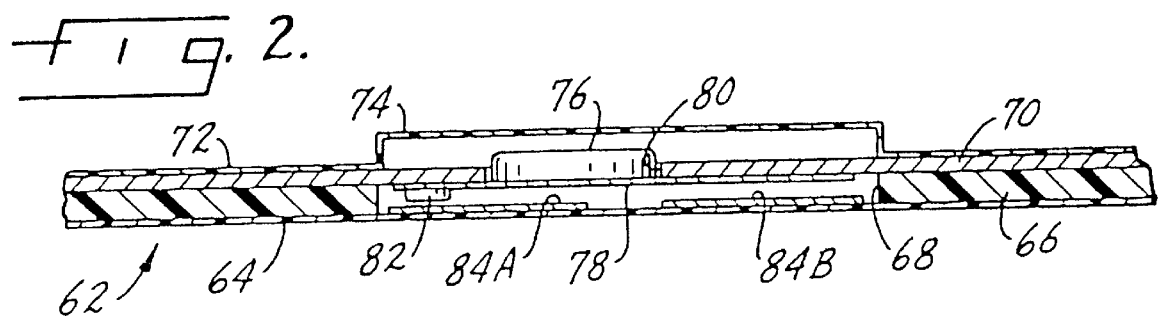
FIG. 2 is a section through a pushbutton switch, taken generally along line 2—2 of FIG. 1.

FIGS. 1 and 2 illustrate the pushbutton switch 62 according to the present invention. Starting from the bottom up, the switch 62 includes a substrate 64, a spacer 66 with an opening 68 therein, a layer 70 of a sheet magnet and a membrane 72. Alternately, the membrane could be deleted, although it is preferred to have a membrane to seal against dust, dirt and liquids as well as to provide a surface for graphics to be printed. The membrane is normally embossed as at 74 to provide space for the actuating button 76 formed on armature 78. This space could also be made by placing a second spacer in between the top surface of magnetic layer 70 and the underside of the membrane 72.

The armature 78 is located primarily within spacer opening 68. Its actuating button 76 protrudes through an aperture 80 in the magnetic layer 70. The lower surface of the armature has a fulcrum. In this case the fulcrum takes the form of a pair of extensions 82. The extensions are shown spaced from the electrode 84A but they could be in contact even when the switch is open. The armature is made of electrically conductive and magnetic material. One example would be soft steel plated with silver. By magnetic material it is meant that the material is affected by a magnet. The magnetic layer 70 holds the armature 78 up against the underside of the layer. Electrodes 84A, 84B are formed on the internal surface of the substrate.

To actuate the pushbutton switch 62 the user will press the actuating button 76. When the user does so pre-travel is achieved when the membrane is first deformed. As the membrane is further deformed the armature abruptly breaks away from the magnetic sheet material thus providing a very crisp tactile sensation. The fulcrum extensions 82 will snap loose from magnetic layer 70 and engage electrode 84A. Thereafter the armature will pivot about the fulcrum and into contact with the electrode 84B. This shorts the electrodes and closes the switch. Upon release of the closing pressure, the magnetic attraction between layer 70 and the armature 78 will return the armature to the position of FIG. 2, thereby reopening the switch. Since the button 76 extends through aperture 80, the magnetic layer 70 moves very little, if at all during closure.

Improved tactile feel can be achieved by placing a ferromagnetic material on the top surface of the magnet sheet layer 70. This material has the effect of directing the magnetic field downwardly toward the armature. This material further enhances the tactile sensation by providing rigidity to the magnetic sheet material. One example of such a material would be a thin soft steel sheet.

The pushbutton switch as shown and described can be afforded a custom tactile feel by changing the position and size of the actuating button. Increased switch travel and/or overtravel can be achieved by adjusting the geometry and size of the armature. Ultra-short switch travel can be achieved by adjusting the position of the actuating button. Stand-alone, individual, discrete switches can be fabricated. The magnetic return force allows switches to be held in the actuated position for extended periods without becoming permanently actuated. Backlighting can be achieved by providing a hole in the armature. High temperature manufacturing processes including wave soldering can be used with high temperature materials. A printed circuit board could be used as a substrate. If an extra set of electrical contacts were located under the magnetic layer 70 (either on the layer 70 or on a membrane under the layer 70) a normally-closed switch could be incorporated in the switch of FIGS. 1 and 2.

Figure 3:
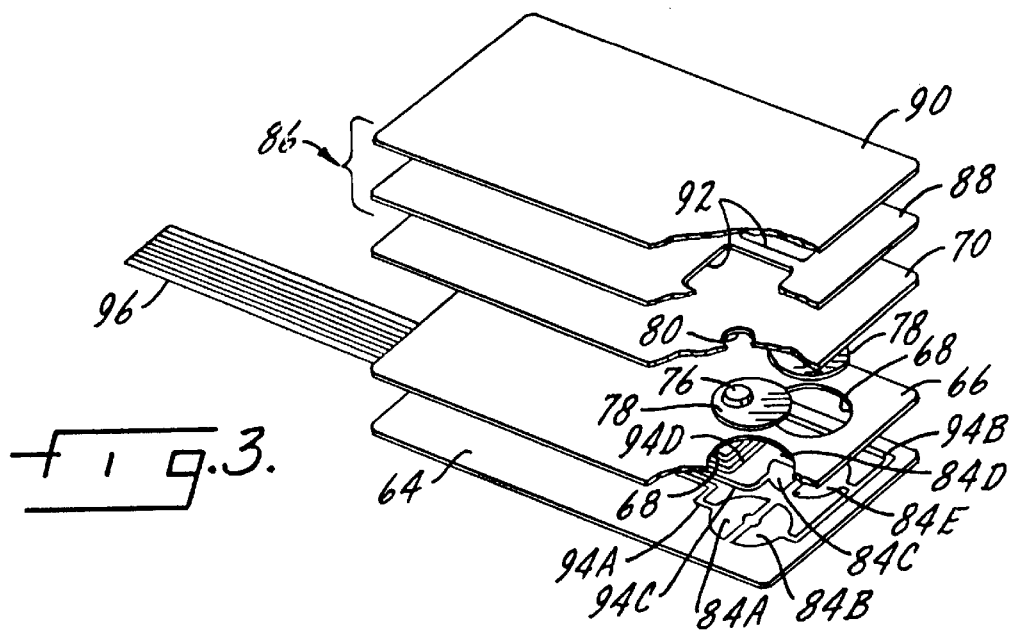
FIG. 3 is an exploded perspective view of an alternate embodiment of a pushbutton switch, illustrating both single and double pole contacts and the removable overlay.
Figure 4:
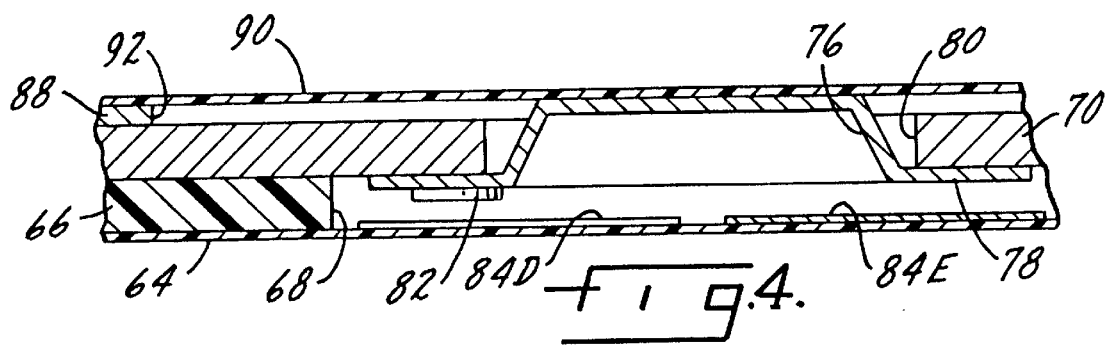
FIG. 4 is an enlarged sectional view of a portion of the switch of FIG. 3.

FIGS. 3 and 4 illustrate an alternate embodiment of the pushbutton switch wherein a removable overlay 86 is substituted for the membrane 72. The remaining portions of the switch remain the same and will not be described again. Overlay 86 comprises a metallic layer 88 and a top layer 90. The metallic layer is made of magnetic material, such as sheet metal. Metallic layer 88 preferably has openings 92 cut therein such that an opening 92 is aligned with each underlying switch. The top layer 90 is made of plastic material that readily accepts printed material. Thus, the top layer carries indicia suitable for the particular application to identify switch location, operation, function or the like. The top layer may be adhesively secured to the metallic layer. The overlay is retained on the switch by the magnetic attraction between the metallic layer 88 and the magnetic layer 70. In ordinary use the attractive forces are sufficient to keep the overlay in place. But if replacement of the overlay is desired, such as to change the graphical components on the top layer 90, the overlay can be tipped up and removed from the magnetic layer as shown in FIG. 5.

FIG. 3 illustrates two electrode arrangements, a single pole switch and a double pole switch. The single pole switch includes electrodes or contact pads 84A and 84B. As seen in both FIGS. 2 and 3, the pads are separated from one another by a gap. Each electrode has its own lead 94A and 94B. The leads extend to a tail 96 for connection to external electronics (not shown). The double pole switch is similar but has one of its electrode pads split in two, as seen at 84C and 84D. These electrode pads are adjacent a third, spaced apart electrode pad 84E. Leads 94C and 94D connect to electrodes 84C and 84D. Lead 94B connects to electrode 84E, making electrodes 84B and 84E common between the two switches.

With the double pole version, when the portion of the armature having the fulcrum 82 breaks away from the magnetic layer 70 it bottoms on the pads 84C and 84D and shorts them, closing a first pole. Thereafter the armature pivots about the fulcrum 82, bringing the remaining portion of the armature into contact with pad 84E, shorting it to pads 84C and 84D.

Figure 5:
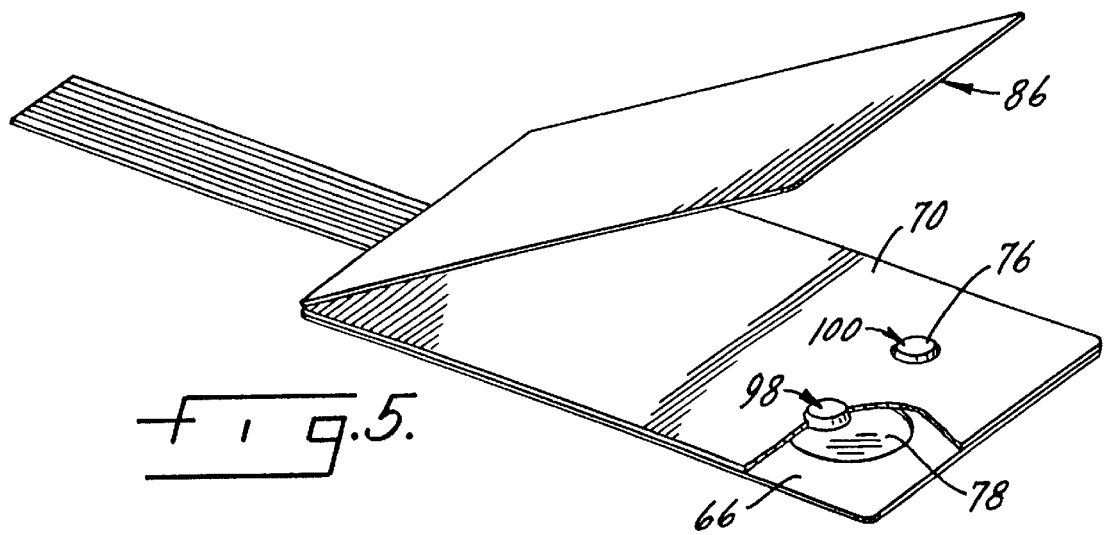
FIG. 5 is a perspective view of a business card switch having a removable overlay.

FIG. 5 also shows how a novel business card and test sample can be fabricated using the pushbutton switch and the removable overlay of the present invention. In this case two pushbutton switches 98 and 100 are grouped on one end of the card. One of the switches can be a double pole switch as described above. The overlay can be removed and replaced by one including combination of any of the various switches included in this invention and its parent patents. This will, for example, allow a salesperson to present to a customer a custom-configured test sample as a particular situation requires. Or a customer could modify it himself at his convenience. The custom replaceable magnetically-attached overlay makes this possible.

While a preferred form of the invention has been shown and described, it will be realized that alterations and modifications may be made thereto without departing from the scope of the following claims. For example, the positions of the electrodes could be reversed, i.e., they could be placed on the magnetic layer rather than on the substrate such that the electrodes are normally closed instead of normally open.

What is claimed is:

1. An electrical switch panel, comprising:

a substrate;

a non-conductive spacer mounted on the substrate and having at least one opening therein;

a set of electrodes disposed on the substrate in said opening and defining at least one pair of spaced contact pads;

a coupler layer on the spacer, the coupler layer being a permanent magnet and having an aperture therein;

an electrically conductive armature disposed between the coupler layer and the switch contacts in the spacer opening, the armature being made of magnetic material such that the armature is normally held spaced from the switch contacts in engagement with said coupler layer by the magnetic attraction between the coupler layer and armature, the coupler layer aperture permitting an actuating force acting therethrough to separate the armature from the coupler layer and move the armature into engagement with the contact pads; and an overlay disposed on the coupler layer on the side opposite the spacer, the overlay comprising a metallic layer adjacent the coupler layer and a flexible top layer secured to the metallic layer, the metallic layer having at least one opening aligned with the armature, the top layer covering said at least one opening in the metallic layer, the overlay being retained by magnetic attraction between the coupler layer and the overlay.

2. The switch panel of claim 1 further comprising indicia formed on the top layer and disposed above the opening in the metallic layer.

* * * * *